United States Patent
Semprevivo et al.

(10) Patent No.: US 10,204,141 B1
(45) Date of Patent: Feb. 12, 2019

(54) SYSTEM AND METHOD OF REMOVING DUPLICATE LEADS

(71) Applicant: LMB MORTGAGE SERVICES, INC., Playa Vista, CA (US)

(72) Inventors: Stephen Semprevivo, Los Angeles, CA (US); Matt Wells, Santa Monica, CA (US)

(73) Assignee: LMB MORTGAGE SERVICES, INC., Playa Vista, CA (US)

( * ) Notice: Subject to any disclaimer, the term of this patent is extended or adjusted under 35 U.S.C. 154(b) by 0 days.

(21) Appl. No.: 14/827,760

(22) Filed: Aug. 17, 2015

Related U.S. Application Data

(63) Continuation of application No. 14/231,484, filed on Mar. 31, 2014, now Pat. No. 9,110,916, which is a continuation of application No. 13/159,118, filed on Jun. 13, 2011, now Pat. No. 8,688,724, which is a continuation of application No. 12/697,116, filed on Jan. 29, 2010, now Pat. No. 7,962,501, which is a continuation of application No. 11/683,688, filed on Mar. 8, 2007, now Pat. No. 7,657,569, which is a continuation of application No. 11/564,164, filed on Nov. 28, 2006, now abandoned.

(51) Int. Cl.
 *G06F 17/30* (2006.01)
(52) U.S. Cl.
 CPC .. *G06F 17/30489* (2013.01); *G06F 17/30371* (2013.01)
(58) Field of Classification Search
 CPC combination set(s) only.
 See application file for complete search history.

(56) References Cited

U.S. PATENT DOCUMENTS

| 4,982,346 A | 1/1991 | Girouard et al. |
| 5,056,019 A | 10/1991 | Schultz et al. |

(Continued)

FOREIGN PATENT DOCUMENTS

| GB | 2 384 087 | 7/2003 |
| GB | 2 392 748 | 3/2004 |

(Continued)

OTHER PUBLICATIONS

Authenticom, "What's in a Name?", downloaded from http://web.archive.org/web/20070708185835/http://www.authenticom.com/story.html, 1 page, Apr. 1, 2009.

(Continued)

*Primary Examiner* — Etienne P Leroux
(74) *Attorney, Agent, or Firm* — Knobbe, Martens, Olson and Bear, LLP

(57) ABSTRACT

A duplicate lead removal system comprises a matching engine, a vendor duplicates database, and a conflict engine. The matching engine is configured to determine at least one vendor to receive a lead. The vendor duplicates database is configured to store duplicate lead information that is at least partly created by and received from vendors outside of the duplicate lead removal system. The conflict engine is configured to compare information that is at least derived from the lead with information stored in the vendor duplicates database in order to determine if the lead is a duplicate lead for the vendor such that the system can prevent transmission of duplicate leads to the vendor.

20 Claims, 5 Drawing Sheets

(56) References Cited

U.S. PATENT DOCUMENTS

| | | |
|---|---|---|
| 5,353,218 A | 10/1994 | DeLapa et al. |
| 5,454,030 A | 9/1995 | de Oliveira et al. |
| 5,459,306 A | 10/1995 | Stein et al. |
| 5,504,675 A | 4/1996 | Cragun et al. |
| 5,521,813 A | 5/1996 | Fox et al. |
| 5,583,763 A | 12/1996 | Atcheson et al. |
| 5,621,812 A | 4/1997 | Deaton et al. |
| 5,628,004 A | 5/1997 | Gormley et al. |
| 5,649,114 A | 7/1997 | Deaton et al. |
| 5,692,107 A | 11/1997 | Simoudis et al. |
| 5,696,907 A | 12/1997 | Tom |
| 5,745,654 A | 4/1998 | Titan |
| 5,774,868 A | 6/1998 | Cragun et al. |
| 5,774,870 A | 6/1998 | Storey |
| 5,802,142 A | 9/1998 | Browne |
| 5,819,226 A | 10/1998 | Gopinathan et al. |
| 5,857,175 A | 1/1999 | Day et al. |
| 5,864,822 A | 1/1999 | Baker, III |
| 5,878,403 A | 3/1999 | DeFrancesco et al. |
| 5,884,287 A | 3/1999 | Edesess |
| 5,884,289 A | 3/1999 | Anderson et al. |
| 5,926,800 A | 7/1999 | Baronowski et al. |
| 5,930,764 A | 7/1999 | Melchione et al. |
| 5,933,813 A | 8/1999 | Teicher et al. |
| 5,953,707 A | 9/1999 | Huang et al. |
| 6,009,415 A | 12/1999 | Shurling et al. |
| 6,029,139 A | 2/2000 | Cunningham et al. |
| 6,029,154 A | 2/2000 | Pettitt |
| 6,067,525 A | 5/2000 | Johnson et al. |
| 6,078,892 A | 6/2000 | Anderson et al. |
| 6,094,643 A | 7/2000 | Anderson et al. |
| 6,119,103 A | 9/2000 | Basch et al. |
| 6,208,979 B1 | 3/2001 | Sinclair |
| 6,233,566 B1 | 5/2001 | Levine |
| 6,269,325 B1 | 7/2001 | Lee et al. |
| 6,321,205 B1 | 11/2001 | Eder |
| 6,330,546 B1 | 12/2001 | Gopinathan et al. |
| 6,385,594 B1 | 5/2002 | Lebda et al. |
| 6,393,406 B1 | 5/2002 | Eder |
| 6,418,436 B1 | 7/2002 | Degen et al. |
| 6,430,539 B1 | 8/2002 | Lazarus et al. |
| 6,513,018 B1 | 1/2003 | Culhane |
| 6,529,878 B2 | 3/2003 | De Rafael et al. |
| 6,542,894 B1 | 4/2003 | Lee et al. |
| 6,597,775 B2 | 7/2003 | Lawyer et al. |
| 6,615,193 B1 | 9/2003 | Kingdon et al. |
| 6,714,918 B2 | 3/2004 | Hillmer et al. |
| 6,782,390 B2 | 8/2004 | Lee et al. |
| 6,823,319 B1 | 11/2004 | Lynch et al. |
| 6,839,682 B1 | 1/2005 | Blume et al. |
| 6,850,606 B2 | 2/2005 | Lawyer et al. |
| 6,868,389 B1 | 3/2005 | Wilkins et al. |
| 6,873,979 B2 | 3/2005 | Fishman et al. |
| 6,925,441 B1 | 8/2005 | Jones, III et al. |
| 7,006,614 B2 | 2/2006 | Feinberg et al. |
| 7,035,699 B1 | 4/2006 | Anderson et al. |
| 7,043,531 B1 | 5/2006 | Seibel et al. |
| 7,047,251 B2 | 5/2006 | Reed et al. |
| 7,096,205 B2 | 8/2006 | Hansen et al. |
| 7,096,220 B1 | 8/2006 | Seibel et al. |
| 7,136,448 B1 | 11/2006 | Venkaperumal et al. |
| 7,228,284 B1 | 6/2007 | Vaillancourt et al. |
| 7,263,506 B2 | 8/2007 | Lee et al. |
| 7,277,875 B2 | 10/2007 | Serrano-Morales et al. |
| 7,296,734 B2 | 11/2007 | Pliha |
| 7,305,364 B2 | 12/2007 | Nabe et al. |
| 7,333,976 B1 | 2/2008 | Auerbach et al. |
| 7,340,410 B1 | 3/2008 | Vaillancourt et al. |
| 7,383,215 B1 | 6/2008 | Navarro et al. |
| 7,546,243 B2 | 6/2009 | Kapadia et al. |
| 7,630,933 B2 | 12/2009 | Peterson et al. |
| 7,657,569 B1 | 2/2010 | Semprevivo et al. |
| 7,664,668 B2 | 2/2010 | Lissy et al. |
| 7,668,725 B2 | 2/2010 | Alston |
| 7,672,865 B2 | 3/2010 | Kumar et al. |
| 7,752,054 B1 | 7/2010 | Anthony-Hoppe et al. |
| 7,752,236 B2 | 7/2010 | Williams et al. |
| 7,778,885 B1 | 8/2010 | Semprevivo et al. |
| 7,801,843 B2 | 9/2010 | Kumar et al. |
| 7,954,698 B1 | 6/2011 | Pliha |
| 7,962,347 B2 | 6/2011 | Anthony-Hoppe et al. |
| 7,962,501 B1 | 6/2011 | Semprevivo et al. |
| 7,970,672 B2 | 6/2011 | Mendelovich et al. |
| 7,970,690 B2 | 6/2011 | Diana et al. |
| 8,135,607 B2 | 3/2012 | Williams et al. |
| 8,214,262 B1 | 7/2012 | Semprevivo et al. |
| 8,271,313 B2 | 9/2012 | Williams et al. |
| 8,285,656 B1 | 10/2012 | Chang et al. |
| 8,533,038 B2 | 9/2013 | Bergh et al. |
| 8,566,141 B1 | 10/2013 | Nagdev et al. |
| 8,688,724 B1 | 4/2014 | Semprevivo et al. |
| 9,110,916 B1 | 8/2015 | Semprevivo et al. |
| 2001/0014868 A1 | 8/2001 | Herz et al. |
| 2001/0047289 A1 | 11/2001 | Mckee et al. |
| 2002/0035504 A1 | 3/2002 | Dver et al. |
| 2002/0038312 A1 | 3/2002 | Donner et al. |
| 2002/0059095 A1 | 5/2002 | Cook |
| 2002/0072975 A1 | 6/2002 | Steele et al. |
| 2002/0077998 A1 | 6/2002 | Andrews et al. |
| 2002/0082892 A1 | 6/2002 | Reffel et al. |
| 2002/0087460 A1 | 7/2002 | Hornung |
| 2002/0099649 A1 | 7/2002 | Lee et al. |
| 2002/0128960 A1 | 9/2002 | Lambiotte et al. |
| 2002/0136381 A1 | 9/2002 | Shaffer et al. |
| 2002/0143620 A1 | 10/2002 | Kraus |
| 2002/0147695 A1 | 10/2002 | Khedkar et al. |
| 2002/0161711 A1 | 10/2002 | Sartor et al. |
| 2002/0194050 A1 | 12/2002 | Nabe et al. |
| 2003/0009426 A1 | 1/2003 | Ruiz-Sanchez |
| 2003/0065563 A1 | 4/2003 | Elliott et al. |
| 2003/0097320 A1 | 5/2003 | Gordon |
| 2003/0097329 A1 | 5/2003 | Nabe et al. |
| 2003/0158751 A1 | 8/2003 | Suresh et al. |
| 2003/0163363 A1 | 8/2003 | Pratte et al. |
| 2003/0172002 A1 | 9/2003 | Spira et al. |
| 2003/0182214 A1 | 9/2003 | Taylor |
| 2003/0195830 A1 | 10/2003 | Merkoulovitch et al. |
| 2003/0212618 A1 | 11/2003 | Keyes et al. |
| 2003/0217003 A1 | 11/2003 | Weinflash et al. |
| 2003/0220858 A1* | 11/2003 | Lam ............... G06Q 30/04 705/35 |
| 2003/0225692 A1 | 12/2003 | Bosch et al. |
| 2003/0229504 A1 | 12/2003 | Hollister |
| 2004/0030667 A1 | 2/2004 | Xu et al. |
| 2004/0044615 A1 | 3/2004 | Xue et al. |
| 2004/0044617 A1 | 3/2004 | Lu |
| 2004/0052357 A1 | 3/2004 | Logan et al. |
| 2004/0054619 A1 | 3/2004 | Watson et al. |
| 2004/0107132 A1 | 6/2004 | Honarvar et al. |
| 2004/0111312 A1* | 6/2004 | Ingman ............ G06Q 10/06 705/7.13 |
| 2004/0111363 A1 | 6/2004 | Trench et al. |
| 2004/0143482 A1 | 7/2004 | Tivey et al. |
| 2004/0143483 A1* | 7/2004 | Tivey ............... G06Q 99/00 705/500 |
| 2004/0177030 A1 | 9/2004 | Shoham |
| 2004/0177046 A1 | 9/2004 | Ogram |
| 2004/0193535 A1 | 9/2004 | Barazesh |
| 2004/0205157 A1 | 10/2004 | Bibelnieks et al. |
| 2004/0230448 A1 | 11/2004 | Schaich |
| 2004/0243518 A1 | 12/2004 | Clifton et al. |
| 2005/0021476 A1 | 1/2005 | Candella et al. |
| 2005/0027632 A1 | 2/2005 | Zeitoun et al. |
| 2005/0044036 A1 | 2/2005 | Harrington et al. |
| 2005/0065809 A1 | 3/2005 | Henze |
| 2005/0065874 A1 | 3/2005 | Lefner et al. |
| 2005/0075987 A1 | 4/2005 | Pintsov et al. |
| 2005/0080821 A1 | 4/2005 | Breil et al. |
| 2005/0102226 A1 | 5/2005 | Oppenheimer et al. |
| 2005/0108041 A1 | 5/2005 | White |
| 2005/0125350 A1 | 6/2005 | Tidwell et al. |
| 2005/0130704 A1 | 6/2005 | McParland et al. |
| 2005/0131760 A1 | 6/2005 | Manning et al. |
| 2005/0144067 A1 | 6/2005 | Farahat et al. |

(56) References Cited

U.S. PATENT DOCUMENTS

| | | |
|---|---|---|
| 2005/0154648 A1 | 7/2005 | Strause |
| 2005/0154664 A1 | 7/2005 | Guy et al. |
| 2005/0171859 A1 | 8/2005 | Harrington et al. |
| 2005/0182774 A1 | 8/2005 | Weir et al. |
| 2005/0187860 A1 | 8/2005 | Peterson et al. |
| 2005/0209922 A1 | 9/2005 | Hofmeister |
| 2005/0222906 A1 | 10/2005 | Chen |
| 2005/0267812 A1 | 12/2005 | Jensen et al. |
| 2005/0273442 A1 | 12/2005 | Bennett et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2006/0004731 A1 | 1/2006 | Seibel et al. |
| 2006/0041464 A1 | 2/2006 | Powers et al. |
| 2006/0041500 A1 | 2/2006 | Diana et al. |
| 2006/0059073 A1 | 3/2006 | Walzak |
| 2006/0064340 A1 | 3/2006 | Cook |
| 2006/0080230 A1 | 4/2006 | Freiberg |
| 2006/0080263 A1 | 4/2006 | Willis et al. |
| 2006/0100944 A1 | 5/2006 | Reddin et al. |
| 2006/0106668 A1 | 5/2006 | Kim et al. |
| 2006/0129422 A1 | 6/2006 | Kim et al. |
| 2006/0129428 A1 | 6/2006 | Wennberg |
| 2006/0143695 A1 | 6/2006 | Grynberg |
| 2006/0178971 A1 | 8/2006 | Owen et al. |
| 2006/0184417 A1 | 8/2006 | Van der Linden et al. |
| 2006/0200396 A1 | 9/2006 | Satterfield et al. |
| 2006/0204051 A1 | 9/2006 | Holland, IV |
| 2006/0239512 A1 | 10/2006 | Petrillo |
| 2006/0242000 A1 | 10/2006 | Giguiere |
| 2006/0265259 A1 | 11/2006 | Diana et al. |
| 2006/0271457 A1 | 11/2006 | Romain et al. |
| 2007/0016522 A1 | 1/2007 | Wang |
| 2007/0033227 A1 | 2/2007 | Gaito et al. |
| 2007/0038483 A1 | 2/2007 | Wood |
| 2007/0067234 A1 | 3/2007 | Beech et al. |
| 2007/0067297 A1 | 3/2007 | Kublickis |
| 2007/0072190 A1 | 3/2007 | Aggarwal |
| 2007/0093234 A1 | 4/2007 | Willis et al. |
| 2007/0106582 A1 | 5/2007 | Baker et al. |
| 2007/0112582 A1 | 5/2007 | Fenlon |
| 2007/0118435 A1 | 5/2007 | Ran |
| 2007/0150372 A1 | 6/2007 | Schoenberg |
| 2007/0192248 A1 | 8/2007 | West |
| 2007/0205266 A1 | 9/2007 | Carr et al. |
| 2007/0214076 A1 | 9/2007 | Robida et al. |
| 2007/0220003 A1 | 9/2007 | Chern et al. |
| 2007/0233559 A1 | 10/2007 | Golec |
| 2007/0233561 A1 | 10/2007 | Golec |
| 2007/0239721 A1 | 10/2007 | Ullman et al. |
| 2007/0299771 A1 | 12/2007 | Brody et al. |
| 2008/0033869 A1 | 2/2008 | Steele et al. |
| 2008/0091535 A1 | 4/2008 | Heiser et al. |
| 2008/0103960 A1 | 5/2008 | Sweeney |
| 2008/0109444 A1 | 5/2008 | Williams et al. |
| 2008/0109445 A1 | 5/2008 | Williams et al. |
| 2008/0120155 A1 | 5/2008 | Pliha |
| 2008/0288361 A1 | 11/2008 | Rego et al. |
| 2008/0300962 A1 | 12/2008 | Cawston et al. |
| 2010/0023447 A1 | 1/2010 | Mac Innis |

FOREIGN PATENT DOCUMENTS

| | | |
|---|---|---|
| JP | 2003-016261 | 1/2003 |
| TW | 256569 | 6/2006 |
| WO | WO 91/03789 | 3/1991 |
| WO | WO 97/023838 | 7/1997 |
| WO | WO 99/033012 | 7/1999 |
| WO | WO 99/046710 | 9/1999 |
| WO | WO 02/027610 | 4/2002 |
| WO | WO 03/071388 | 8/2003 |
| WO | WO 2004/046882 | 6/2004 |
| WO | WO 2005/036859 | 4/2005 |
| WO | WO 2006/110873 | 10/2006 |
| WO | WO 2008/057853 | 5/2008 |

OTHER PUBLICATIONS

Authenticom, Technical Specs, "Confidence Level Indicators (CLI)", downloaded from http://www.authenticom.com/confidence_level_indicators.shtml, 2 pages, Aug. 17, 2006.

Bitran et al., "Mailing Decisions in Catalog Sales Industry", Management Science (JSTOR), vol. 42, No. 9, pp. 1364-1381, Sep. 1996.

Caliendo, et al.; "Some Practical Guidance for the Implementation of Propensity Score Matching"; IZA:Discussion Paper Series; No. 1588; Germany; May 2005.

ChannelWave.com, PRM Central—About PRM, http://web.archive.org/web/20000510214859/http://www.channelwave.com as printed on Jun. 21, 2006, May 2000 Archive.

Charles Chung, Internet Retailer, "Multi-channel retailing requires the cleanest data—but don't expect it from the customer", Jan./Feb. 2002.

Dymi, Amilda, Need for Leads Spurs Some Upgrades, Origination News—Special Report, May 1, 2008, vol. vol. 17, Issue No. 8, pp. p. 24, Atlanta, Copyright 2008 SourceMedia, Inc.

eFunds Corporation, Data & Decisioning, Debit Report, Apr. 1, 2007, http://www.efunds.com/web/industry-solutions/financial-services/fr.

Erschik, Richard, Sales Leads Can Truly Be Seeds of Sales, The Journal of Business & Industrial Marketing, Summer/Fall 1989, vol. vol. 4, Issue No. 2.

FinExtra, Basepoint Analytics Introduces Predictive Technology for Mortgage Fraud, May 10, 2005.

Greco, Susan, The Rating Game: Grade you Leads to Clear the Pipe Dreams from you Sales Pipeline, Online Reprint, Jan. 1998, vol. vol. 20, Issue No. 1, pp. p. 93 (1-3).

Griggs, Robyn, Give us Leads! Give us Leads!, Sales and Marketing Management, Jul. 1997, vol. 149, Issue 7, pp. ABI/Inform Global, p. 66.

Hennessey, Hubert D., Software Propels the Selling Cycle, Software Magazine, Jun. 1988, vol. 8, Issue 8, pp. ABI/Inform Global p. 57-64.

"Impac Funding Introduces Enhanced Website for Static Pool Tracking of MBS Transactions," Webpage printed out from http://www.lewtan.com/press/1208044_Impac-Lewtan.htm on Mar. 20, 2008.

Industry News, New Technology Identifies Mortgage Fraud: Basepoint Analytics Launches FraudMark, Inman News, Oct. 5, 2005, American Land Title Association.

"Intelligent Miner Applications Guide"; Chapters 4-7; p. 33-132; IBM Corp., Apr. 2, 1999.

International Search Report and Written Opinion in PCT/US2007/63822, dated Sep. 11, 2007.

International Search Report and Written Opinion for PCT/US2007/63824, dated Oct. 9, 2007.

International Search Report and Written Opinion for PCT/US2007/63823, dated Oct. 24, 2007.

International Search Report and Written Opinion for PCT/US2007/83055, dated Oct. 30, 2007.

International Search Report and Written Opinion for PCT/US2007/06070, dated Nov. 10, 2008.

International Search Report and Written Opinion in PCT/US2008/064594, dated Oct. 8, 2008.

International Search Report and Written Opinion for PCT/US2007/83055, dated Jan. 7, 2009.

Lamons, Bob; Be Smart: Offer Inquiry Qualification Services, Marketing News, Nov. 6, 1995, vol. 29, No. 23, ABI/Inform Global, p. 13.

Leadmaster; http://web.archive.org/web/20001206021800/http://leadmaster.com/index.html as printed on Jan. 18, 2006, Dec. 2000.

LeadVerifier: Why Should You Use LeadVerifier?, downloaded from www.leadverifier.com/LeadVerifier_Why.asp, Copyright 2005, 2 pgs.

Loshin, Intelligent Enterprise: Better Insight for Business Decisions, "Value-Added Data: Merge Ahead", Feb. 9, 2000, vol. 3, No. 3, 5 pages.

(56) References Cited

OTHER PUBLICATIONS

LowerMyBills, Inc., "Lower Your Mortgage with a Lender You Can Trust" http://webarchive.org/web/20071110203156/http;//www.lowermybills.com/ dated Nov. 10, 2007, printed Aug. 20, 2012 in 11 pages.

MarketSoft.com, Turning Inquiries into Revenue: Leads are the Key, eLeads MarketSoft http://web.archive.org/web/20000309005815/marketsoft.com.product.index.htm as printed on Jun. 22, 2006, Feb. 2000.

Otter, et al., "Direct Mail Selection by Joint Modeling of the Probability and Quantity of Response", Jun. 1997, pp. 14.

Polatoglu et al., "Theory and Methodology, Probability Distributions of Cost, Revenue and Profit over a Warranty Cycle", European Journal of Operational Research, vol. 108, Issue 1, Jul. 1998, pp. 170-183.8, p. 170-83.

PR Web: Press Release Newswire, "Anchor Launches LeadVerifier to Verify, Correct and Enhance Internet Leads", 2 pages, Aug. 8, 2005.

"PrimeQ Lead Validation Techniques Gets Stronger", http://66.102.7.104/search?g=cache:gXAdm0EXcwYJ:www.primeg.com/absolutenm/anmv in 2 pages, Nov. 29, 2005.

"Rap Interactive, Inc. and Web Decisions: A Powerful New Information and Technology Resource that Revolutionizes Interactive Marketing," Livedecisions, 2 pages.

Real IQ, "Lead Metrix", downloaded from http://www.realiq.com/leadmetrix.html, 1 page, Aug. 17, 2006.

Real IQ, "Mortgage Industry", downloaded from http://www.realiq.com/mortgage.html, 4 pages, Aug. 17, 2006.

Real IQ, RealIQ.com, retrieved from web.archive.org http://replay.web.archive.org/20051212152337/http://www.realiq.com/mortgage.html as printed on Apr. 28, 2011, pp. 2 pgs.

SalesLogix.net, SalesLogix Sales Tour, http://web.archive.org/web/20010411115938/www.saleslogix.com/home/index.php3celli as printed on Aug. 30, 2005, Apr. 2000, pp. 19.

ServiceObjects, "DOTS Web Services—Product Directory", downloaded from http://www.serviceobjects.com/products/directory_of_web_services.asp, 4 pages, Aug. 17, 2006.

ServiceObjects, "Real-Time Customer Intelligence for a Nickel", downloaded from http://www.serviceobjects.com/prodcts/defauly.asp, 3 pages, Aug. 17, 2006.

Steele, Georgia, Pipeline Software Tracks Process; Tired of Dealing with Lead Generation Firms, CitiPacific Mortgage has built a tool that will allow Mortgage Originators to Track Leads in an Integrated Sales and Marketing Approach, Broker Magazone, Mar. 2006, vol. vol. 8, Issue Iss. 2, pp. 26, New York.

Tao, Lixin; "Shifting Paradigms with the Application Service Provider Model"; Concordia University, Canada; IEEE; Oct. 2001.

TARGUSinfo: "Intermark Media Slashes Returned Lead Costs, Improves Affiliate Relations," downloaded from www.targusinfo.com, 2007, pp. 4.

TARGUSinfo: Lead Verification, Verify Your Leads With Unique Accuracy and Ease, downloaded from wwww.targusinfo.com/solutions/verify/Default.asp, Copyright 2004-2006.

TARGUSinfo: Solutions: Services: Verify Express—Verify, Correct and Enhance Customer Provided Data, <http:www.targusinfo.com/solutions/services/verify/> Oct. 28, 2005, 27 pgs.

The Center for Financial Services Innovation, A Case Study of Checking Account Inquiries and Closures in Chicago, Nov. 2006.

Thoemmes, Felix; "Propensity Score Matching in SPSS"; Center for Educational Science and Psychology, University of Tubingen; Jan. 2012.

W.A. Lee, American Banker: The Financial Services Daily, Experian, On Deal Hunt, Nets Identity Theft Insurer, Jun. 4, 2003.

Web Decisions, "Live Decisions", downloaded from http://www.webdecisions.com, 2 pages, Sep. 18, 2006.

\* cited by examiner

Conflict and Duplicate Removal

ABC Mortgage Co.
~~ACME Lending~~
FastLoans.Com
~~XYZ Lending~~
Kassle Funding Corp.
Specialty Financing (Removed from list because ACME already has the lead.)

(Removed because XYZ is a subsidiary of ABC.)

*FIG. 6*

SYSTEM AND METHOD OF REMOVING DUPLICATE LEADS

RELATED APPLICATIONS

This application is related to the applications identified in the foreign and domestic priority sections of the Application Data Sheet. The entire disclosures of the applications identified in the foreign and domestic priority sections of the Application Data Sheet filed with this application are hereby incorporated by reference into this application.

BACKGROUND OF THE INVENTION

Field of the Invention

Embodiments of the systems and methods described herein relate to removing duplicate consumer leads.

Description of the Related Art

Consumer lead generation is a large and growing industry. The lead generation industry identifies individual or business consumers that may be interested in buying products or services and sells contact information for those consumers to providers of the products or services. For example, a residential loan lead generation company, such as LowerMyBills.com, identifies consumers interested in getting a residential loan and sells the consumers' contact information to lenders of residential loans. The contact information of the potentially interested buyer is known as a "lead."

Lead generation companies sell leads for many products and services, including residential loans, commercial loans, real estate agents, automobiles, attorneys, housecleaners, and many other products and services. Providers of such products and services buy leads because leads effectively identify consumers that are already interested in the providers' products and services. Accordingly, leads often result in more sales than advertising, cold calling, or other forms of salesmanship.

Because of the effectiveness of leads, some product and service providers periodically buy leads, or generate their own leads, from multiple sources. Unfortunately, such product and service providers may get duplicate leads, thus depriving the providers of the full value of each lead. Duplicate leads also hurt lead generation companies because the companies must generally either refund the purchase price of duplicate leads or discount the price of all leads to account for duplicate leads.

SUMMARY

In this application we describe embodiments of systems and methods that identify and remove duplicate leads before they are provided to a lead buyer. These systems and methods increase the value of each lead. Lead generation companies benefit because they can sell each lead at a higher price. Lead buyers benefit because they receive fewer duplicate leads, thereby reducing the lost value of duplicate leads and the burden of detecting duplicate leads.

One duplicate lead removal system comprises a database of duplicate leads and a conflict engine configured to detect and remove duplicate leads. In this embodiment, the conflict engine compares leads, from whatever source obtained, with information about leads already received that is stored in the duplicate lead database. The system can then provide a group of leads to a vendor that excludes the leads already received. In this fashion, the system reduces the chance that the vendor will receive duplicate leads.

A lead may be a duplicate lead for one vendor but may not be a duplicate lead for another vendor. Accordingly, the duplicate lead database preferably identifies duplicate leads on a vendor-by-vendor basis. In one embodiment, a separate duplicate lead database exists for each vendor. For example, one duplicate lead database may include the leads already received by ABC Mortgage Company and a separate duplicate lead database may include the leads already received by Specialty Financing. Alternatively, the system may use a single duplicate lead database that includes records designating which vendor or vendors have already received a particular lead.

In one variation, the system periodically receives updates to the duplicate lead database. In one advantageous variation, the vendors provide the system with information about the leads that the vendors already have. For example, each vendor may create a duplicate lead file that the system periodically downloads and uses to update the duplicate lead database. Alternatively, vendors may transmit duplicate lead information to the system in real time so that the system can update the duplicate lead database immediately. Alternatively, the vendors may maintain duplicate lead databases that the system may query in real time just prior to transmitting leads to vendors. These methods of updating the duplicate lead database (or of querying vendor-maintained databases) allow each vendor, rather than the system, to define the vendor's set of duplicate leads, advantageously causing the system to exclude duplicate leads generated by the vendor itself or otherwise obtained from a source not affiliated with the system. In contrast, other mechanisms for removing duplicate leads, such as excluding leads that the system previously sent to the vendor, may not detect and remove duplicate leads generated outside of the system.

Optionally, the systems and methods allow each vendor to define the vendor's set of duplicate leads without requiring the vendor to disclose complete consumer contact information associated with each lead. In one embodiment, the duplicate lead database stores only a portion of the contact information of each lead, such as, for example, the lead's zip code and a limited number of positions in the lead's street address. Advantageously, the amount of information stored, while not enough to reveal the full contact information, is preferably enough to determine whether the lead is a duplicate.

Not requiring the vendor to disclose complete consumer contact information is advantageous in at least three ways. First, it requires fewer computational and storage resources because less information must be transmitted and stored. Second, it increases the vendor's trust in the duplicate lead removal system because the system does not receive enough contact information to resell the vendor's leads to another vendor. Third, it reduces or eliminates consumer privacy concerns because the limited amount of information that is transmitted is unlikely to result in the disclosure of sensitive information.

Herein we describe examples or embodiments of systems and methods to remove duplicate leads such that a skilled artisan will understand a few different ways to make and use the invention. However, the invention is not limited to just the described embodiments. Rather, the invention encompasses each disclosed embodiment individually, any combination or subset of the disclosed embodiments, and any variation of the disclosed embodiments that is appreciated by a skilled artisan in light of this disclosure. For example, while we describe many advantageous features and components, a skilled artisan will appreciate, in light of this disclosure, that these features and components are not necessary parts of every embodiment, but can be omitted from or changed in some embodiments.

BRIEF DESCRIPTION OF THE DRAWINGS

FIG. 6 is an example that illustrates one way that a conflict engine may remove duplicate leads and other conflicts.

DETAILED DESCRIPTION OF PREFERRED EMBODIMENTS

Figure 1:
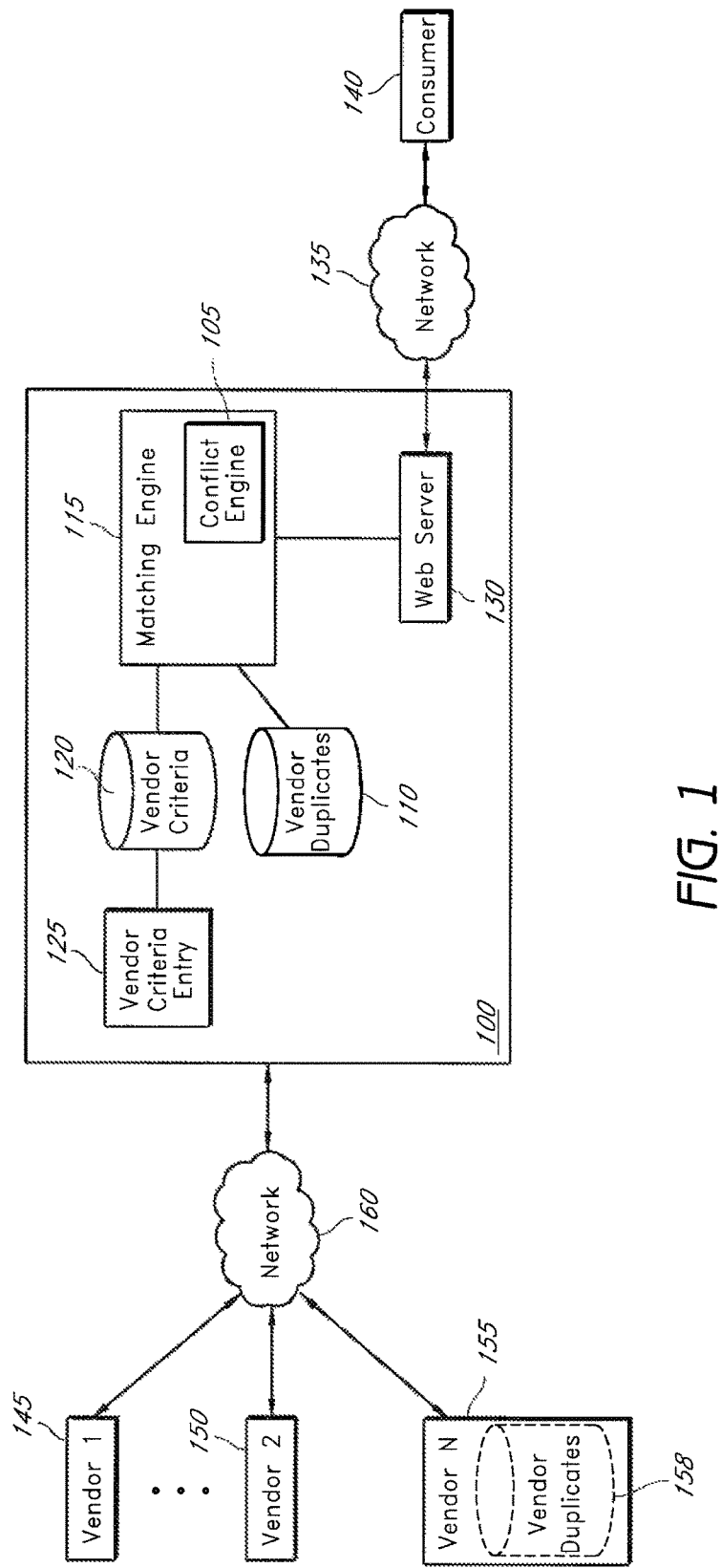
FIG. 1 is a block diagram that illustrates one implementation of a duplicate lead removal system connected to a network.

FIG. 1 is a block diagram that illustrates one implementation of a duplicate lead removal system connected to a network. The duplicate lead removal system 100 of FIG. 1, and the embodiments of other figures, may be implemented in the context of a loan lead generation system such as the system embodied at the web site www.lowermybills.com. We offer this context to illustrate one concrete application of the duplicate lead removal system 100 in order to help a skilled artisan understand how the duplicate lead removal system 100 may be used in practice. The invention, however, is not limited to removing duplicate leads for the lending industry. Rather, a skilled artisan will appreciate, in light of this disclosure, that the systems and methods described herein can be used to remove any kind of duplicate leads, including, without limitation, leads for residential loans, commercial loans, real estate agents, automobiles, attorneys, housecleaners, or any other product or service. The term "vendor" refers broadly to any potential lead buyer, of whatever industry, that offers one or more products or services.

To further illustrate a concrete application of the duplicate lead removal system 100, we describe the duplicate lead removal system 100 in the context of a lead generation system that generates leads using the Internet. An example of such a lead generation system is found on the web site located at www.lowermybills.com. This site prompts a consumer interested in obtaining a loan to enter his own contact information into a web-based form and sends the contact information to a group of matched lenders selected by the consumer.

In one embodiment, components of an Internet-based lead generation system include a matching engine 115, a vendor criteria database 120, a vendor criteria entry component 125, and a web server 130. In general, the lead generation system generates a lead when a consumer 140 accesses the web server 130 over a network 135 such as the Internet. The web server 130 serves web pages that prompt the consumer 140 to enter his contact information into a web-based form. The consumer 140 may also be prompted to enter other information to assist the system to match the consumer 140 with vendors that offer the products or services that the consumer 140 wants.

Generally, the vendor criteria database 120 includes criteria that define characteristics of consumers with whom each vendor wants to be matched. In the context of lending, a lender's criteria may specify that the lender wants to be matched with consumers that have excellent credit and that seek a home purchase loan for more than $300,000. In the context of selling cars, a car dealer's criteria may specify that the dealer wants to be matched with consumers that want to buy a new Honda car with a Manufacturer's Suggested Retail Price of at least $15,000. Generally, the matching engine 115 compares characteristics of the consumer 140 with the vendor criteria database 120 to match the consumer 140 with one or more vendors. In some cases the consumer 140 may not meet any vendor's criteria and the matching engine 115 may not make a match.

Generally, the vendor criteria entry component 125 comprises computer-executable instructions stored on a computer-readable medium that are configured, when executed by a general-purpose computer, to allow a user to update the vendor criteria database 120. Alternatively, the vendor criteria entry component 125 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "vendor criteria entry component" encompasses all of these implementations. In one embodiment, the vendor criteria entry component 125 is accessible to a plurality of vendors 145, 150, and 155 over a network 160, such that the vendors 145, 150, and 155 can directly update their own criteria. Alternatively, the vendor criteria entry component 125 is not accessible to the vendors 145, 150, and 155, such that a person or automated process affiliated with the lead generation system must update the vendor criteria database 120. The network 160 may or may not be the same network as the network 135.

Generally, the matching engine 115 comprises computer-executable instructions stored on a computer-readable medium that are configured, when executed by a general-purpose computer, to match the consumer 140 to one or more vendors based on vendor criteria and characteristics of the consumer 140. Alternatively, the matching engine 115 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "matching engine" encompasses all of these implementations.

In one embodiment, the matching engine 115 matches the consumer 140 with vendors by comparing characteristics of the consumer 140 with vendor criteria stored in the vendor criteria database 120. The matching engine 115 may require an exact match (e.g. the consumer 140 meets all of a vendor's criteria) or the matching engine 115 may make matches that are close but not exact (e.g. the consumer 140 meets an acceptable level of the vendor's criteria). In some cases the matching engine 115 may match the consumer 140 with only one vendor, while in others the matching engine 115 may match the consumer 140 with multiple vendors. An advantage of matching with just one vendor is that the vendor gets an exclusive lead that likely has more value than a lead that the vendor shares with other vendors. An advantage of matching with multiple vendors is that the vendors may compete with each other to win the consumer's business, which may result in a better price for the consumer. In some cases, the matching engine 115 may not be able to make any matches because the consumer 140 may have characteristics that do not match any vendor's criteria.

The consumer 140 characteristics may be collected in many ways. One way to collect the consumer 140 characteristics is to have the consumer 140 fill out a web-based form served by the web server 130. The consumer 140 may be asked, for example, to provide his contact information and information about his creditworthiness, job, income, interests, and the like. In some cases the consumer 140 may be asked to estimate some of these characteristics rather than provide an exact value. A skilled artisan will appreciate, in light of this disclosure, that the characteristics requested differ on the type of lead that is being generated and the type of information that vendors care about for qualifying a consumer as a potential buyer. Thus, in the context of mortgage loans, creditworthiness is an important characteristic. However, in the context of a product such as a computer that the consumer 140 will likely purchase using cash or a credit card, creditworthiness is less important.

Another way to collect the consumer 140 characteristics is to look up information about the consumer 140 stored in a database. An example of this approach is to request a credit report for the consumer 140 after obtaining the Social Security number from the consumer 140. Still other ways to collect consumer 140 characteristics exist outside of the context of web-based lead generation systems. For example, the consumer 140 can be asked to fill out a paper form or to answer questions during a face-to-face or telephone survey or interview.

A web-based lead generation system, such as the example described above, is a preferred way to collect leads for sending to vendors. However, while we describe embodiments of a duplicate lead removal system 100 in the context of such a web-based lead generation system, the duplicate lead removal system 100 can be used to remove duplicate leads generated in other ways, including leads generated from paper forms or from face-to-face or telephone surveys or interviews. It is advantageous to use a computerized method of generating leads because such leads will already be stored in electronic form and can easily be compared to the vendor duplicates database 110 described herein. However, non-electronic leads can be manually or automatically converted (such as by optical character recognition or the like) into electronic form so that the duplicate lead removal system 100 can be used with them.

The illustrated duplicate lead removal system 100 comprises a conflict engine 105 and a vendor duplicates database 110. The vendor duplicates database 110 comprises information about leads that a vendor has already received. Preferably, the information stored in the vendor duplicates database 110 stores enough information about each lead to determine, to an acceptable degree of accuracy, whether another lead is a duplicate. The acceptable degree of accuracy need not be 100%, and the vendor duplicates database 110 need not store complete contact information for each lead. For example, in one embodiment, the vendor duplicates database 110 stores, for each lead, a zip code and the first eight positions of a street address. This information is sufficient to accurately determine whether a lead has the same address as another lead for almost all addresses in the United States, without requiring the storage of complete contact information for each lead. The zip code plus eight positions of street address format is not required; a skilled artisan will appreciate that many other formats may be used.

The term "database," as used with respect to the vendor duplicates database 110 and the vendor criteria database 120, encompasses any group of data that stores information about duplicate leads or vendor criteria. These databases need not require Structured Query Language ("SQL"), a relational database management system, or any other query language or database management system, for accessing the information stored therein. Moreover, these databases are not limited to any particular format. Rather, these databases may be simple text files that have an entry on each line or multiple entries on a single line separated by commas, tabs, semicolons, or the like. Alternatively, these databases may comprise all or portions of many computer files stored in one or more directories or folders.

In one embodiment, the conflict engine 105 comprises computer-executable instructions stored on a computer-readable medium that are configured, when executed by a general-purpose computer, to determine whether a lead is a duplicate lead. Alternatively, the conflict engine 105 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "conflict engine" encompasses all of these implementations.

An implementation of the conflict engine 105 determines whether a lead is a duplicate lead by extracting from the lead the fields of information stored in the vendor duplicates database 110 and comparing the extracted information with the vendor duplicates database 110 to determine if any record matches the extracted information. For the implementation in which the vendor duplicates database 110 stores a zip code and the first eight positions of a street address for each record, the extracted information is a zip code and the first eight positions of a street address. (The term "record," as used herein, is not strictly confined to any particular structure and encompasses, for example, an entry in a text file.) If any record matches the extracted information, the lead is deemed to be a duplicate. In one variation, the extracted information must exactly match a record for the lead to be deemed to be a duplicate. In other variations, the match need not be exact but must be within a desired degree of accuracy. Determining matches based on only part of the contact information stored in a lead advantageously increases the accuracy of the matching process. For example, determining matches based just on a zip code and the first eight positions of a street address reduces the chance that typing errors or variations in spelling or punctuation may prevent an otherwise identical address from being deemed a duplicate.

One advantageous variant of the duplicate lead removal system 100 runs the conflict engine 105 in real-time just before sending leads to matched vendors. In this variant, the matching engine 115 matches the consumer 140 with a number of vendors. The conflict engine 105 then compares the lead with the vendor duplicates database 110 to determine if any of the matched vendors already have the lead. The conflict engine 105 excludes the lead as a duplicate lead for any vendor that already has the lead, such that the system 100 can send the lead only to those vendors that do not already have the lead. Real-time duplicate lead removal helps both consumers and vendors. Consumers benefit because they are matched with vendors that do not already have the lead and thus are more likely to contact the consumer. Vendors benefit because they receive leads that are less likely to be duplicates, thus reducing the cost and effort of detecting duplicate leads and the loss of value resulting from duplicate leads.

An advantageous variant of the duplicate lead removal system 100 periodically updates the vendor duplicates database 110 to reflect the leads that each vendor has received within a certain period of time. In one embodiment, the system 100 stores leads in the vendor duplicates database 110 for 60 days. Alternatively, the system 100 may store leads in the vendor duplicates database 110 for 90 days or any other reasonable period. The time period is preferably set to distinguish true duplicate leads from legitimate repeat consumers. A true duplicate lead occurs when a consumer seeks a product or service during a single period but the lead is generated by more than one source. A legitimate repeat consumer is one that completes a transaction, waits for a period, and decides to enter into another transaction. As will be appreciated by a skilled artisan, the "reasonable" period for distinguishing true duplicates from legitimate repeat consumers may differ based on the type of product or service that the consumer seeks.

In various alternative embodiments, a vendor may maintain a vendor duplicates database 158 in addition to or in place of the system's vendor duplicates database 110. In such embodiments, the system 100 may query the vendor's vendor duplicates database 158 in real time at the time that a lead is being generated. If the system 100 determines, based on the query of the vendor's vendor duplicates database 158, that the lead is a duplicate lead, the system 100 does not transmit the lead to that vendor. Advantageously, such an approach ensures that the system 100 accesses the latest duplicate lead information maintained by the vendor without requiring the system 100 to periodically update its own vendor duplicates database 110. Alternatively, the system 100 can maintain a vendor duplicates database 110 that is updated in real time when changes occur in the vendors vendor duplicates database 158. For example, the system's vendor duplicates database 110 and the vendor's vendor duplicates database 158 may be linked together via Open Database Connectivity ("ODBC") or via any other mechanism for linking databases together. A skilled artisan will appreciate, in light of this disclosure, that there are many mechanisms for linking databases together and that any such mechanism can be used.

We have described embodiments of the system 100 that remove duplicate leads based on vendor duplicates provided by vendors. Alternatively or additionally, the system 100 can remove duplicate leads based on leads that the system 100 has already sent to the vendor. In such an embodiment, the system 100 includes a vendor leads database (not shown) that stores information about the leads that the system 100 has already sent to each vendor. Upon matching a lead to a particular vendor, the system 100 may check the vendor leads database to determine whether the lead has already been sent to that vendor. If the lead has already been sent to that vendor, the system 100 does not transmit the lead to the vendor.

Figure 2:
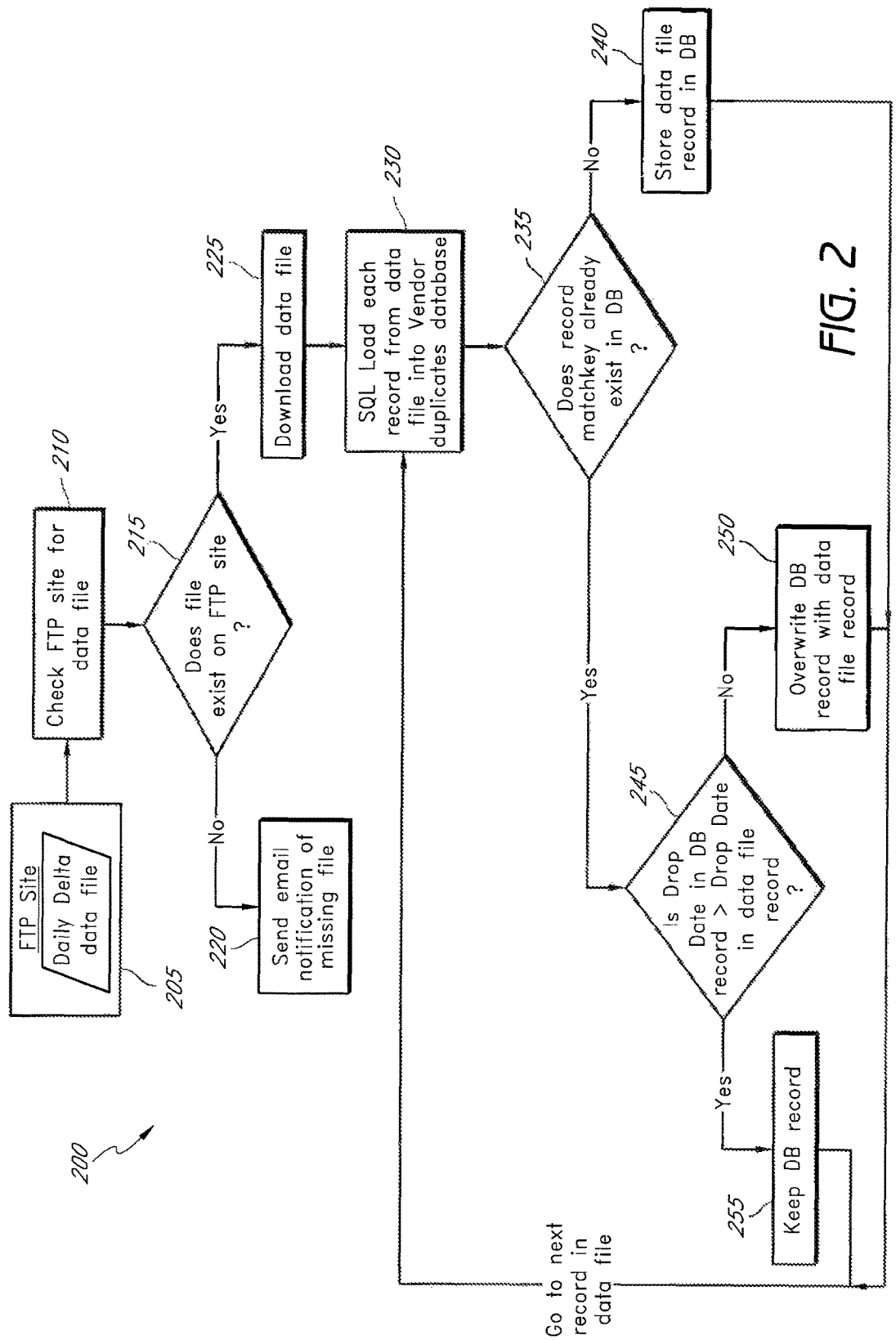
FIG. 2 is a flowchart that illustrates one process of periodically updating the vendor duplicates database.

FIG. 2 is a flowchart that illustrates one process of periodically updating the vendor duplicates database 110. A process 200 for periodically updating the vendor duplicates database 110 begins in a block 205 with a vendor loading a daily delta file onto a File Transfer Protocol ("FTP") site. The daily delta file includes new duplicate leads that the vendor has received since the previous day. The delta files can be updated more or less frequently, such as hourly, every four hours, every two days, weekly, or any other length of time. Further, they need not be stored on an FTP site. Rather, any transmission protocol can be used. In a block 210, the process 200 checks the FTP site. In a decision block 215, the process 200 determines if a data file exists on the FTP site. If a file does not exist, an email is sent in a block 220 to notify the vendor that the file is missing. Notification is not required and, if performed, other forms of notification may be used. If a file exists at the FTP site, the process 200 proceeds, in a block 225 to download the data file.

In a block 230, the process 200 performs an SQL load of each record from the data file. SQL load is not required; any other method for loading data can be used. In a decision block 235, the process 200 determines whether the record's matchkey already exists in the vendor duplicates database 110. As indicated above, in one embodiment a record matchkey comprises a zip code and the first eight positions of a street address. If the record matchkey does not already exist, the record is added to the vendor duplicates database 110. If the record matchkey already exists, the process 200 proceeds to a decision block 245, in which it is determined whether the drop date in the database record is later than the drop date in the data file record. The purpose of the drop date is to make sure that duplicate leads are stored in the vendor duplicates database 110 for a reasonable period of time. Periodically, the system 100 purges any records in the vendor duplicates database 110 whose drop dates have passed. If the database drop date is not later than the data file drop date, the process 200 proceeds, in a block 250, to overwrite the database record with the data file record. If the database drop date is later than the data file drop date, the process 200 keeps the database record (and thus ignores the data file record). In either case, the process 200 proceeds to process the next data file record, beginning at the block 230.

Figure 3:
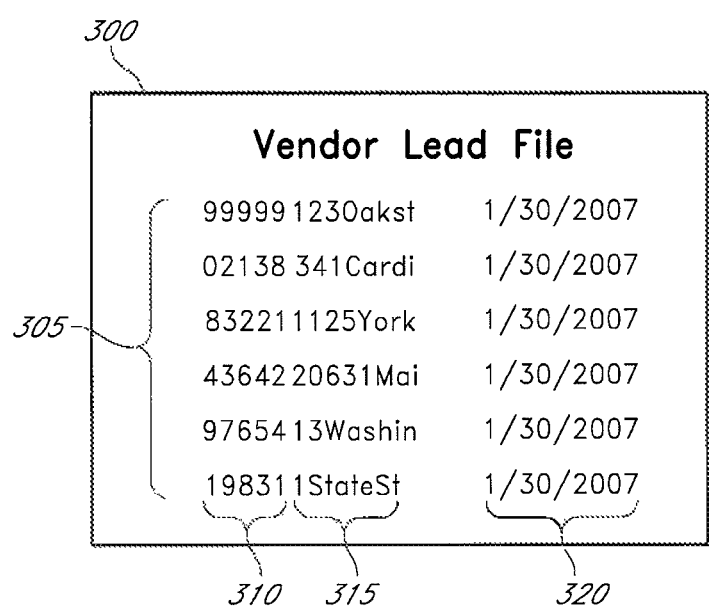
FIG. 3 is a simplified vendor lead file that illustrates one format for the data file records and the database records.

FIG. 3 is a simplified vendor lead file that illustrates one format for the data file records and the database records discussed above. The formats of the data file records and the database records need not be the same, although the records preferably store the same information for easy comparison and determination of duplicates. It is advantageous, but not required, to have the matchkey fields have the same format so that conversion is not required before comparison of the database file records with the database records. As illustrated, a vendor lead file 300 may include a number of entries 305. Each entry 305 may comprise a zip code 310, 8 positions of a street address 315, and a drop date 320. The vendor lead file 300 may be a text file or a file of any other format. The entries 305 may be on separate lines or may be separated by commas, semicolons, tabs, or the like.

Figure 4:
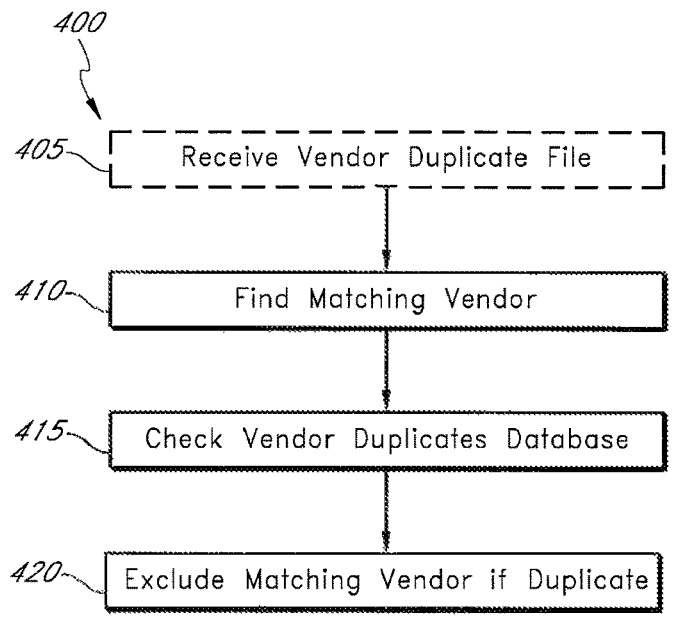
FIG. 4 is a flowchart that illustrates one process of removing duplicate leads.

FIG. 4 is a flowchart that illustrates one process of removing duplicate leads. A process 400 of removing duplicate leads begins in a block 405, in which the process 400 receives a vendor duplicate file. A skilled artisan will appreciate, in light of this disclosure, that the receipt of a vendor duplicate file may occur substantially before the other steps in the process 400. Indeed, receiving a vendor duplicate file is not necessary in cases where a vendor duplicates database has already been created. In a block 410, the process 400 finds a matching vendor to whom a lead may be sent. In a block 415, the process 400 checks the vendor's duplicates database to determine if the lead is a duplicate lead. In a block 420, the process 400 excludes the matching vendor if the lead is a duplicate lead, such that the lead is not sent to the matching vendor.

Figure 5:
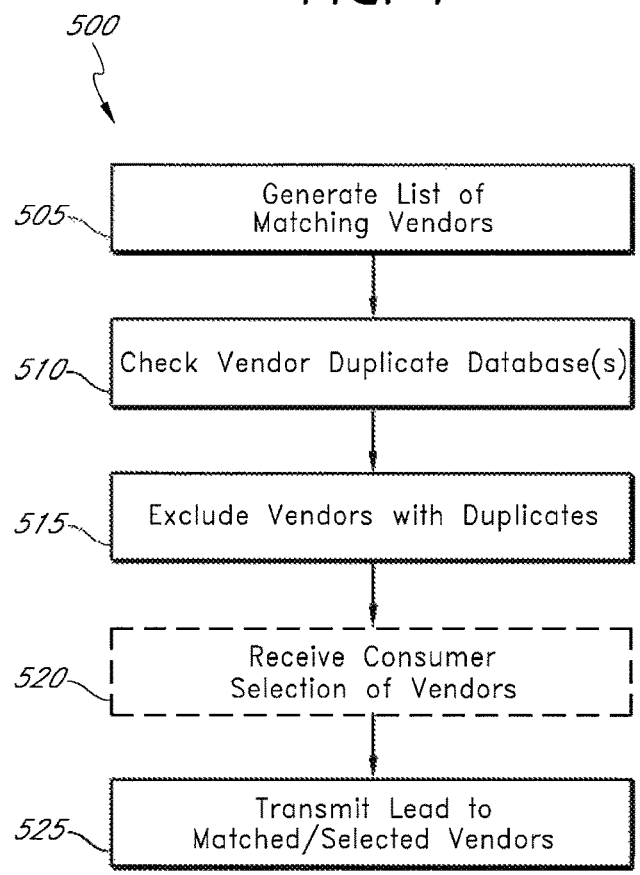
FIG. 5 is a flowchart that illustrates another process of removing duplicate leads.

FIG. 5 is a flowchart that illustrates another process of removing duplicate leads. A process 500 of removing duplicate leads begins in a block 505, in which the process 500 generates a list of matching vendors to whom a lead may be sent. In a block 510, the process 500 checks one or more vendor duplicates databases to determine if the lead is a duplicate lead for any of the vendors. In a block 515, the process 500 excludes vendors for whom the lead is a duplicate lead, such that the lead is not sent to the excluded vendors. In a block 520, the process 500 optionally receives a consumer selection of some of the non-excluded vendors. In a block 525, the process 500 transmits the lead to the matched and/or selected vendors (who have not been excluded).

Neither the system 100, the process 400, nor the process 500 requires duplicate lead removal for every vendor that receives leads from the system 100. Some vendors may choose not to provide lead duplicate information with which to build or update the vendor duplicates database 110. In addition, vendors are not required to send all of their leads to the system, and some vendors may choose to provide only some of their leads. Advantageously, therefore, the vendor is able to control which leads are part of the duplicate lead removal process. Further, a lead generation company may choose to provide duplicate lead removal only for certain vendors, such as, for example, vendors that buy a large volume of leads from the lead generation company. Accordingly, while it is preferable to perform a duplicate lead removal process for every lead and every vendor, this is not required. Rather, the embodiments described herein can perform the duplicate lead removal process only for some vendors or only for some leads with respect to some vendors.

The process 400 and the process 500, and any other process set forth herein or apparent to a skilled artisan in light of this disclosure, can be embodied in computer-executable instructions stored on a computer-readable medium, such that the processes are performed when the computer-executable instructions are executed by a general purpose computer. Alternatively, the processes may be embodied in hardware components, firmware components, or components that are some combination of hardware, firmware, and software, that perform the equivalent functions. A skilled artisan will understand that hardware, firmware, software, or combination embodiments are equivalent, and will understand how to make and use any of these embodiments.

FIG. 6 is an example that illustrates one way that the conflict engine 105 may remove duplicate leads and other conflicts. As explained above, the conflict engine 105 may detect and remove duplicate leads. In one embodiment of the duplicate lead removal system 100, the detection and removal of duplicate leads is a specific case of a more general process of detecting and removing "conflicts" with particular leads. As used herein, a "conflict" is simply an undesirable circumstance under which a particular vendor should not receive a particular lead. The duplicate lead removal system 100 seeks to avoid conflicts by detecting them and preventing the particular vendor from receiving the particular lead.

A duplicate lead is one example of a conflict because a vendor should not receive leads that it already has. Another example of a conflict is when two vendors who are really a part of the same organization (such as parent and subsidiary companies) are both matched with the same consumer. It is generally undesirable to send a lead to multiple parts of the same organization because this either creates undesirable competition within the organization or gives a false impression to the consumer that more competition exists than actually does. The duplicate lead removal system 100 may seek to avoid other vendor business conflicts as well.

In one embodiment, as illustrated in FIG. 6, the duplicate lead removal system 100 matches the consumer 140 with a number of vendors. In the illustrated example, in the context of the lending industry, the system 100 has matched the consumer 140 with six lenders, including ABC Mortgage Co., ACME Lending, FastLoans.com, XYZ Lending, Kassle Funding Corp., and Specialty Financing. Upon generating the initial list of matched vendors, the system 100 applies conflict rules to exclude vendors that create a conflict. In one embodiment, each conflict rule is applied in sequence to each vendor on the list before the next conflict rule is applied. Alternatively, each vendor is processed in turn (and all conflict checks are run for the vendor) to determine if there is any conflict with that vendor. Processing each vendor in turn has the advantage of allowing the system to end conflict testing early when a desired number of matched vendors are found that have no conflicts. However, the conflict rules can be applied in sequence in a manner that minimizes duplicative computations. For example, the conflict rules can be applied to only a subset of the matched vendors and further testing can be ended if enough matched vendors are left after the conflict testing.

In the illustrated example, the system 100 applies the conflict rules to each of the matched vendors in turn. As shown, the system 100 determines that there is no conflict with the ABC Mortgage Co., so that company is not excluded. The system 100 determines that ACME Lending does have a conflict because the lead is a duplicate lead for ACME Lending. Thus, the system 100 removes ACME Lending from the list. The system 100 determines that there is no conflict with FastLoans.com, and that company remains on the list. The system 100 determines that XYZ Lending has a conflict because XYZ Lending is a subsidiary of ABC Mortgage Co., and the particular conflict rules for those companies require that only one lead be sent to the companies affiliated with ABC Mortgage Co. The system 100 determines that there is no conflict with Kassle Funding Co. and Specialty Financing, and those companies remain on the list. After conflict testing completes, the system 100 has reduced the matched vendor list to four lenders who may receive the lead.

In general, the systems and methods of removing duplicate leads that we have described above are used to prevent vendors from receiving duplicate leads. Additionally, in one embodiment, the duplicate lead removal system 100 may alert a vendor when a duplicate lead occurs. In some cases it may be advantageous for a vendor who has already received a lead for a consumer to know that the consumer has been matched with other vendors. For example, if a consumer has signed up with a phone company but then seeks to be matched with other phone companies a month later, it may be advantageous for the first phone company to know that the consumer may be considering a switch to a different phone company. In such cases, being informed of a duplicate lead may allow the first phone company to make an attempt to keep the consumer from switching to a different phone company.

We have described the foregoing embodiments by way of example and not limitation. A skilled artisan will appreciate, in light of this disclosure, that the invention is not limited to the disclosed embodiments, but encompasses the disclosed embodiments individually, combinations of features of the disclosed embodiments, and variations of the disclosed embodiments that are apparent to a skilled artisan in light of this disclosure. For example, a skilled artisan will appreciate that many of the features described herein can be modified or omitted from certain embodiments without departing from the invention.

We claim:

1. A consumer lead removal system comprising:
   at least one computer-readable medium configured to store data and computer-executable instructions;
   computer hardware comprising at least one computer processor in communication with the computer-readable medium and configured to access the data and computer-executable instructions stored in the computer-readable medium and to cause the computer hardware to perform operations defined by the computer-executable instructions;
   a matching engine comprising a plurality of computer-executable instructions stored in the computer-readable medium and configured, when the instructions are executed by the computer processor, to cause the computer hardware to:
      determine one or more vendor match rules usable to identify consumer leads to provide to respective vendors;
      apply the one or more vendor match rules to identify a particular consumer lead including consumer attributes satisfying vendor match rules associated with at least one matched vendor;
   a vendor lead database configured to store, for each vendor of a plurality of vendors:
      incomplete prior lead information for each of a plurality of leads already transmitted to the vendor, or received from the vendor, wherein each incomplete prior lead comprises at least a zip code and a portion of a street address for corresponding prior leads, the incomplete prior lead information being insufficient to contact a corresponding consumer; and
   a conflict engine comprising a plurality of computer-executable instructions stored in the computer-readable medium and configured, when the instructions are executed by the computer processor, to cause the computer hardware to:
      determine that the particular consumer lead is not a prior lead for the matched vendor based on a comparison between the particular consumer lead and the incomplete prior lead information already transmitted to the vendor, or received from the vendor, stored in the vendor lead database,
      wherein, upon determination that the particular consumer lead is not a prior lead for the matched vendor, transmit the consumer lead to the matched vendor and immediately update the vendor lead database to include at least a zip code and a portion of a street address of the particular consumer lead in association with the matched vendor; or
      wherein, upon determination that the particular consumer lead is a prior lead for the matched vendor, prevent transmission of the consumer lead to the matched vendor, thereby enabling the system to reduce utilization of computing resources by preventing transmission of duplicate leads to the matched vendor.

2. The system of claim 1, wherein the system is further configured to: (1) receive, from a source outside of the system, vendor lead files that comprise information about prior leads that the vendors have already received, and (2) update the vendor lead database to include the received prior lead information.

3. The system of claim 2, wherein the system is further configured to receive the vendor lead files by downloading the vendor lead files from an FTP site.

4. The system of claim 1, wherein at least a portion of the prior lead information stored in the vendor lead database relates to leads that vendors outside of the system generated or received from a lead generation entity different from the system.

5. The system of claim 1, wherein the incomplete prior lead information comprises at least eight positions of a street address for each prior lead.

6. The system of claim 1, wherein the vendor lead database is configured to store enough information to identify prior leads to a desired degree of accuracy but not enough information to generate complete leads.

7. The system of claim 1, wherein the conflict engine is further configured to detect when a lead has been matched to multiple entities that are parts of a common organization and to cause the system to not transmit the lead to more than one of the multiple entities.

8. The system of claim 7, wherein the conflict engine is further configured to detect when a lead has been matched to both a parent entity and a subsidiary entity.

9. A method of removing duplicate consumer leads comprising:
   accessing computer-executable instructions stored in at least one computer-readable medium; and
   executing the computer-executable instructions on at least one computer processor, thereby causing computer hardware to perform operations comprising:
      storing prior lead information in a vendor lead database for each vendor of a plurality of vendors, wherein the prior lead information is indicative of prior leads that have previously been sent to or received by a vendor, wherein the prior lead information further comprises incomplete prior lead information for each of a plurality of leads already transmitted to the vendor, or received from the vendor, the incomplete prior lead information being insufficient to contact a corresponding consumer;
      receiving a particular consumer lead;
      identifying at least one matched vendor, wherein the matched vendor is a vendor that is eligible to receive the particular consumer lead;
      determining that the particular consumer lead is not a prior lead of the matched vendor based on a comparison between the particular consumer lead and the prior lead information;
      transmitting, upon determination that the particular consumer lead is not a prior lead for the matched vendor, the particular consumer lead to the matched vendor, thereby enabling the system to reduce utilization of computing resources by preventing transmission of prior leads to the matched vendor; and
      updating the vendor lead database to include at least a zip code and a portion of a street address of the particular consumer lead in association with the matched vendor.

10. The method of claim 9, wherein identifying at least one matched vendor comprises identifying a vendor whose criteria for receiving leads matches characteristics of the lead.

11. The method of claim 9, wherein determining that the consumer lead is not a prior lead of the matched vendor comprises comparing information at least derived from the lead with matchkeys stored in the vendor lead database, the matchkeys comprising enough information to detect prior leads but not enough information to generate a complete lead.

12. The method of claim 11, wherein the matchkeys comprise at least a zip code and at least a portion of a street address.

13. The computer-readable medium of claim 12, wherein the computer-executable instructions are further configured, when executed by a processor, to perform the operation of periodically updating the prior lead information based at least in part on information provided by vendors located remotely from the computer-readable medium.

14. The computer-readable medium of claim 13, wherein the operation of periodically updating the prior lead information comprises checking a download site to determine if updated information is loaded on the download site and downloading any updated information loaded on the download site.

15. The computer-readable medium of claim 14, wherein the download site is an FTP site.

16. The computer-readable medium of claim 14, wherein the computer-executable instructions are further configured, when executed by a processor, to perform the operation of detecting at least one conflict with a lead that is not related to the lead being a prior lead.

17. The method of claim 11, wherein the matchkeys comprise at least a zip code and at least eight positions of a street address for each prior lead.

18. A computer-readable medium that stores computer-executable instructions that are configured, when executed by a processor of a computing system, to perform the operations of:
   storing prior lead information in a vendor lead database, wherein the prior lead information is indicative of leads that have been sent to or received by a vendor, wherein the prior lead information further comprises incomplete information for each of a plurality of leads already transmitted to the vendor, or received from the vendor;
   receiving a particular consumer lead;
   identifying at least one matched vendor, wherein the matched vendor is a vendor that is eligible to receive the consumer lead;
   determining that the consumer lead is not a prior lead of the matched vendor based on a comparison between the particular consumer lead and the prior lead information;
   transmitting, upon determination that the particular consumer lead is not a prior lead for the matched vendor, the particular consumer lead to the matched vendor, thereby enabling the computing system to reduce utilization of computing resources by preventing transmission of prior leads to the matched vendor; and
   updating the vendor lead database to include at least a zip code and a portion of a street address of the consumer lead in association with the matched vendor.

19. The computer-readable medium of claim 14, wherein the computer-executable instructions are further configured, when executed by a processor, to perform the operations of receiving consumer selection of a subset of the at least one matched vendor and further restricting transmission of the consumer lead to one or more matched vendors that have been selected by the consumer, wherein the restricted transmission comprises at least the particular consumer lead that is stored in the vendor lead database and associated with one or more matched vendors.

20. The computer-readable medium of claim 18, wherein the incomplete prior lead information being insufficient to contact a corresponding consumer.

\* \* \* \* \*

UNITED STATES PATENT AND TRADEMARK OFFICE
CERTIFICATE OF CORRECTION

PATENT NO.        : 10,204,141 B1
APPLICATION NO.   : 14/827760
DATED             : February 12, 2019
INVENTOR(S)       : Stephen Semprevivo Page 1 of 1

It is certified that error appears in the above-identified patent and that said Letters Patent is hereby corrected as shown below:

Column 1 (Item (56)), Line 4, under Other Publications, change "webarchive.org/" to --web.archive.org/--.

Column 1 (Item (56)), Line 4, under Other Publications, change "/http;//" to --/http://--.

Column 2 (Item (56)), Line 8, under Other Publications, change "defauly." to --default.--.

Signed and Sealed this
Thirteenth Day of August, 2019

Andrei Iancu
*Director of the United States Patent and Trademark Office*